United States Patent
Pflug et al.

(10) Patent No.: US 8,632,431 B2
(45) Date of Patent: Jan. 21, 2014

(54) DRIVE WHEEL OF AN AUXILIARY UNIT BELT DRIVE OF AN INTERNAL COMBUSTION ENGINE

(75) Inventors: Rainer Pflug, Heilsbronn (DE); Steffen Lehmann, Ettlingen (DE); Christian Hauck, Burgthann (DE); Christian Fechler, Karlsruhe (DE); Dimitri Sieber, Ettlingen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 1064 days.

(21) Appl. No.: 11/953,143

(22) Filed: Dec. 10, 2007

(65) Prior Publication Data
US 2008/0318715 A1 Dec. 25, 2008

Related U.S. Application Data

(60) Provisional application No. 60/869,476, filed on Dec. 11, 2006.

(51) Int. Cl.
*F16D 3/00* (2006.01)
*F16H 55/14* (2006.01)
*F16H 55/36* (2006.01)

(52) U.S. Cl.
USPC .......................................................... 474/94

(58) Field of Classification Search
USPC ......... 474/48, 70, 74, 94, 101, 135, 166, 170, 474/178
See application file for complete search history.

(56) References Cited

U.S. PATENT DOCUMENTS

| | | | | |
|---|---|---|---|---|
| 2,105,188 A | * | 1/1938 | Guy | 192/70.17 |
| 3,245,508 A | * | 4/1966 | Livezey | 192/107 R |
| 3,372,561 A | * | 3/1968 | Howard et al. | 464/48 |
| 3,618,730 A | * | 11/1971 | Mould, III | 192/56.2 |
| 3,913,662 A | * | 10/1975 | Davis | 165/8 |
| 3,991,818 A | * | 11/1976 | Wagner | 165/8 |
| 4,254,541 A | * | 3/1981 | St. John | 29/445 |
| 4,710,152 A | * | 12/1987 | Ichikawa et al. | 474/166 |
| 4,732,250 A | * | 3/1988 | Maucher et al. | 192/70.17 |

(Continued)

FOREIGN PATENT DOCUMENTS

| | | |
|---|---|---|
| DE | 42 25 304 | 2/1993 |
| DE | 44 27 636 | 3/1995 |

(Continued)

*Primary Examiner* — William A Rivera
*Assistant Examiner* — Henry Liu
(74) *Attorney, Agent, or Firm* — Lucas & Mercanti, LLP (57) ABSTRACT

The invention relates to a drive wheel (1) of an auxiliary unit belt drive of an internal combustion engine, having a running casing (2) which is operatively connected to a traction mechanism, having a hub (3) which is rotationally fixedly connected to the drive axle of an auxiliary unit, and having a damping device (4), which is arranged so as to act between the running casing (2) and the hub (3), for reducing rotary oscillations, with the damping device (4) comprising a spring store (5) which is arranged so as to act between the running casing (2) and the hub (3). In order that the running casing can be produced more economically, the invention provides that the running casing (2) is composed of a running part (6), a driver part (7) and a spring receptacle (8), with the running part (6) being rotationally fixedly and permanently connected to the driver part (7), and wherein the driver part (7) can be or is connected in a form-fitting manner to the spring receptacle (8).

20 Claims, 6 Drawing Sheets

(56) References Cited

U.S. PATENT DOCUMENTS

| | | | |
|---|---|---|---|
| 4,794,816 A * | 1/1989 | Serizawa et al. | 74/574.4 |
| 4,881,426 A * | 11/1989 | Serizawa et al. | 474/166 |
| 4,917,225 A * | 4/1990 | Diehl et al. | 192/82 T |
| 4,944,712 A * | 7/1990 | Worner et al. | 464/68.92 |
| 5,042,632 A * | 8/1991 | Jackel | 192/55.1 |
| 5,059,156 A * | 10/1991 | Worner et al. | 464/68.41 |
| 5,135,092 A * | 8/1992 | Jackel | 464/68.3 |
| 5,139,463 A * | 8/1992 | Bytzek et al. | 474/69 |
| 5,156,573 A * | 10/1992 | Bytzek et al. | 474/74 |
| 5,195,625 A * | 3/1993 | Chang et al. | 192/84.941 |
| 5,236,396 A * | 8/1993 | Golovatai-Schmidt et al. | 474/101 |
| 5,246,399 A * | 9/1993 | Yanko et al. | 464/67.1 |
| 5,307,710 A * | 5/1994 | Feldhaus et al. | 464/68.3 |
| 5,308,289 A * | 5/1994 | Funahashi | 474/94 |
| 5,352,156 A * | 10/1994 | Klein et al. | 464/63.1 |
| 5,377,962 A * | 1/1995 | Ochs et al. | 267/281 |
| 5,405,296 A * | 4/1995 | Cerny et al. | 474/135 |
| 5,409,423 A * | 4/1995 | Ullrich et al. | 474/170 |
| 5,449,328 A * | 9/1995 | Schmidt et al. | 474/135 |
| 5,611,416 A * | 3/1997 | Berger et al. | 192/58.42 |
| 5,692,410 A * | 12/1997 | Fenelon | 74/411 |
| 5,879,254 A * | 3/1999 | Tanaka | 474/74 |
| 6,048,284 A * | 4/2000 | Gerhardt et al. | 474/178 |
| 6,051,901 A * | 4/2000 | Ishida | 310/83 |
| 6,062,104 A * | 5/2000 | Allport | 464/68.91 |
| 6,083,130 A * | 7/2000 | Mevissen et al. | 474/70 |
| 6,109,227 A * | 8/2000 | Mott | 123/90.31 |
| 6,161,512 A * | 12/2000 | Beels Van Heemstede | 123/90.31 |
| 6,234,288 B1 * | 5/2001 | Reik et al. | 192/55.61 |
| 6,299,541 B1 * | 10/2001 | Bertin et al. | 464/68.92 |
| 6,336,883 B1 * | 1/2002 | Bevc et al. | 474/166 |
| 6,494,799 B1 * | 12/2002 | Ochiai | 474/94 |
| 6,659,252 B2 * | 12/2003 | Heller | 192/85.51 |
| 7,153,227 B2 * | 12/2006 | Dell et al. | 474/70 |
| 7,618,337 B2 * | 11/2009 | Jansen et al. | 474/74 |
| 2002/0016231 A1 * | 2/2002 | Serkh | 474/135 |
| 2006/0240926 A1 * | 10/2006 | Wiesneth et al. | 474/166 |

FOREIGN PATENT DOCUMENTS

| | | |
|---|---|---|
| DE | 195 35 889 | 4/1997 |
| DE | 196 52 730 | 6/1997 |
| DE | 102 16 082 | 6/2003 |
| DE | 103 10 831 | 11/2003 |
| DE | 602 00 178 | 9/2004 |
| DE | 10 2005 029 351 | 1/2006 |
| DE | 10 2005 029 351 X | 10/2006 |
| DE | 10 2006 029 373 | 1/2007 |
| DE | 10 2005 059 030 | 6/2007 |
| EP | 0 980 479 | 2/2000 |
| EP | 1 662 161 A | 5/2006 |
| WO | 2007/000152 PX | 1/2007 |
| WO | 2007/118441 PX | 10/2007 |
| WO | 2008/022897 E | 2/2008 |

* cited by examiner

FIG. 7

DRIVE WHEEL OF AN AUXILIARY UNIT BELT DRIVE OF AN INTERNAL COMBUSTION ENGINE

FIELD OF THE INVENTION

The invention relates to a drive wheel of an auxiliary unit belt drive of an internal combustion engine, having a running casing which is operatively connected to a traction mechanism, having a hub which is rotationally fixedly connected to the drive axle of an auxiliary unit, and having a damping device, which is arranged so as to act between the running casing and the hub, for reducing rotary oscillations, with the damping device comprising a spring store which is arranged so as to act between the running casing and the hub.

BACKGROUND OF THE INVENTION

In order to avoid undesired rotary oscillations within an auxiliary unit belt drive of an internal combustion engine, drive wheels of the specified type are known.

DE 42 25 304 A1 discloses a disk-shaped component for a belt drive, in particular for driving an auxiliary unit of an internal combustion engine, which component can be fastened to the crankshaft of the internal combustion engine. At the same time, the disk-shaped component contains a damping device which is provided between an input part which can be fastened to the crankshaft and an output part which is rotatable relative thereto, with the input and output parts being rotatable relative to one another by means of a rolling bearing arrangement.

DE 196 52 730 A1 discloses a drive wheel, which is provided for arranging on a crankshaft, of an auxiliary unit belt drive, the damping device of which drive wheel comprises a spring store, a friction damper and a vibration absorber.

DE 10 2005 029 351 A1 presents a drive wheel for driving an auxiliary unit of an internal combustion engine of a vehicle having a damping device, with the drive wheel being coupled to a shaft, and with the damping device comprising a torsional vibration damper which operates without lubricant.

Similar solutions are known from DE 102 16 082 A1, from DE 103 10 831 A1, from DE 602 00 178 T2, from DE 195 35 889 A1, from DE 44 27 636 A1 and from EP 0 980 479 B1.

Figure 1:
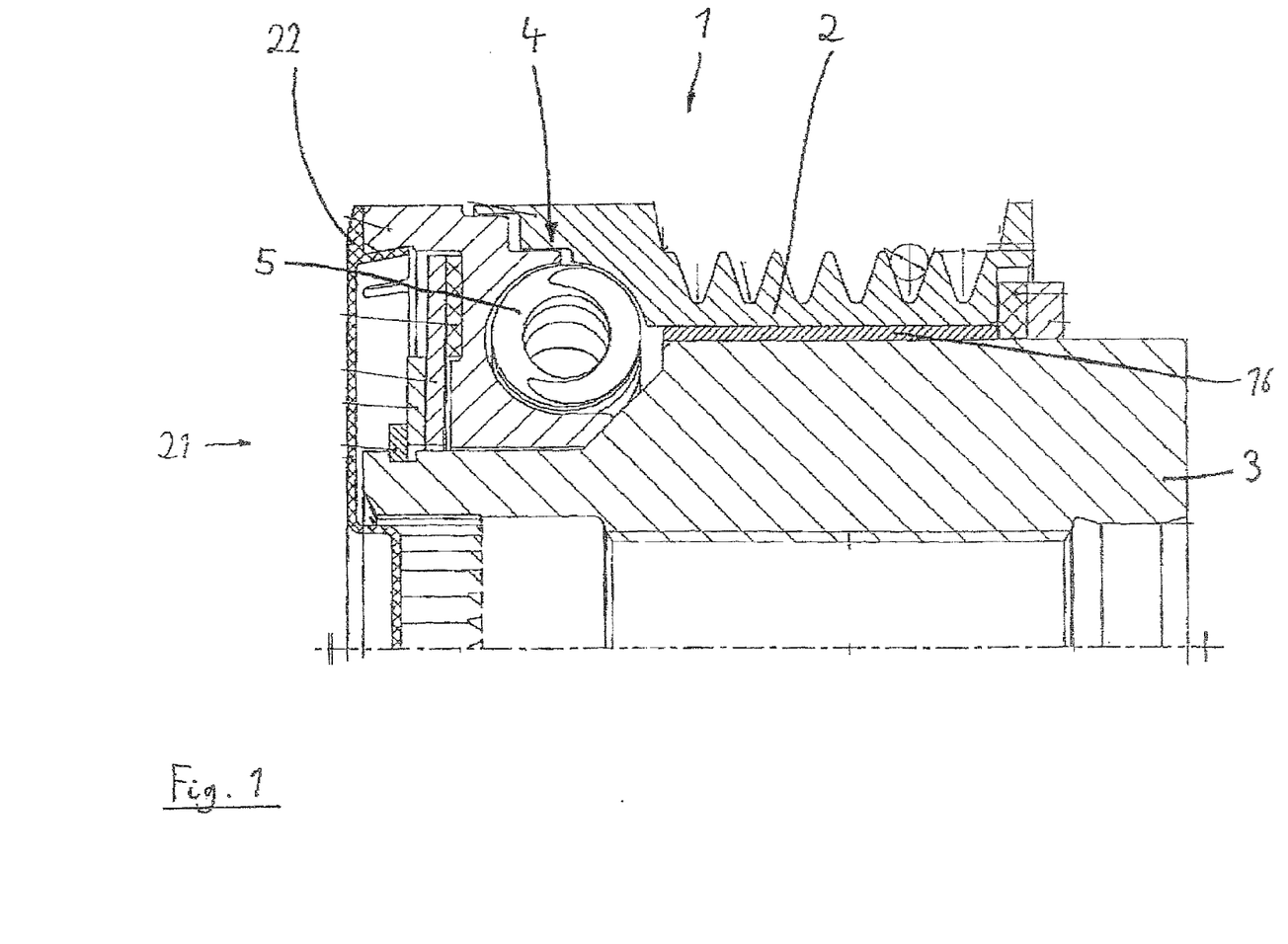
FIG. 1 shows the radial section through a drive wheel of an auxiliary unit belt drive of an internal combustion engine in the assembled state according to a previously-known embodiment.

The construction of a previously-known drive wheel according to a preferred design can be seen from FIG. 1. The drive wheel 1 has a running casing 2 which is mounted by means of a bearing 16 on a hub 3. The rotational connection between the running casing 2 and hub 3 is produced by means of a damping device 4 which has a spring store 5. Said spring store 5 is a bow spring or a number of bow springs which are arranged in corresponding receptacles of the damping device. Here, the one end-side region 21 of the drive wheel 1 is provided, in the usual way, with a cover 22.

A disadvantage of the previously-known solutions is that the production, in particular of the running casing, is relatively complex and therefore expensive. In particular, the bow spring receptacle for the spring of the spring store usually has to be produced in a complex fashion by means of a milling process. The formation of the profiling for the traction mechanism (in FIG. 1, of the V-shaped grooves for a V-belt) also requires a corresponding level of expenditure.

OBJECT OF THE INVENTION

The present invention is therefore based on the object of further developing a drive wheel of the type specified in the introduction in such a way as to permit more simple production of the running casing, wherein a corresponding potential for cost savings should be opened up in this way. Furthermore, it is to be achieved that, nevertheless, a robust bearing-mounting of the running case and of the parts which interact with it is ensured, so as to result in a long service life. The best possible encapsulation of the bearing-mounting of the drive wheel with respect to the environment is also sought.

SUMMARY OF THE INVENTION

The achievement of said object by the invention is characterized in that the running casing of the drive wheel is composed of a running part, a driver part and a spring receptacle—that is to say of a plurality of parts, with the running part being rotationally fixedly and permanently connected to the driver part, and wherein the driver part can be or is connected in a form-fitting manner to the spring receptacle.

In this case, the driver part is preferably embodied as a flat ring which has, at its radially outer and/or at its radially inner end region, a profiling which has at least one undercut in the peripheral direction. A tooth profile is preferably used as a profiling. The spring receptacle can have at least one recess which corresponds to the shape of the profiling.

The driver part can be centered relative to the running part by means of its radially inner region on a seat section of said running part.

The driver part can be fixed to the running part by means of a deformed section of the running part. A calked or flanged portion is specifically intended here.

The running part and the spring receptacle can be fixed relative to one another in the axial direction by means of a form-fitting connection. The form-fitting connection is preferably formed here as a radial projection on the running part which interacts with a radial projection on the spring receptacle. The radial projection on the running part is preferably aligned outward and the radial projection on the spring receptacle is preferably aligned inward. A form-fitting connection in the manner of a clip connection is thus accordingly produced here. For the purpose of more simple assembly, it is advantageously provided that the radial projections are formed so as to be rounded as viewed in radial section.

The driver part is preferably composed of a planar metal sheet. Said driver part can economically be produced by means of a punching process.

A bearing can be arranged between the running casing and the hub. Said bearing can be a rolling bearing, in particular a double-row needle bearing. The bearing can have a seal of any desired type.

The hub can have a cylindrical end region which is rotationally fixedly connected to a driver element. The rotationally fixed connection between the hub and the driver element can be embodied as a spline connection or as a tooth profile connection. In order to obtain a high torque by means of the spring store, one refinement provides that the effective diameter of a spring element of the spring store is formed to be greater than the outer diameter of the running part. The spring element is preferably embodied as a bow spring.

For the purpose of improved cooling, the end-side region of the drive wheel is preferably free from a cover.

Finally, the damping device can comprise a serial arrangement of the spring store and a slipping clutch, with the spring store being arranged so as to act between the running casing and a driver disk which is rotatably mounted on the hub, and the slipping clutch being arranged so as to act between the driver disk and the hub.

In contrast to the previously-known single-part embodiment of the running casing, it is possible with the proposed design of the running casing to produce the latter in a simpler and therefore less expensive manner, with in particular the assembly of the individual parts being of simple configuration. The production expenditure can thus be reduced. A further result is a stable combination of the individual parts of the running casing, so that a high level of wear-resistance and therefore a long service life are ensured.

BRIEF DESCRIPTION OF THE FIGURES

The drawings illustrate an exemplary embodiment of the invention. In the drawings.

DETAILED DESCRIPTION OF THE FIGURES

Figure 2:
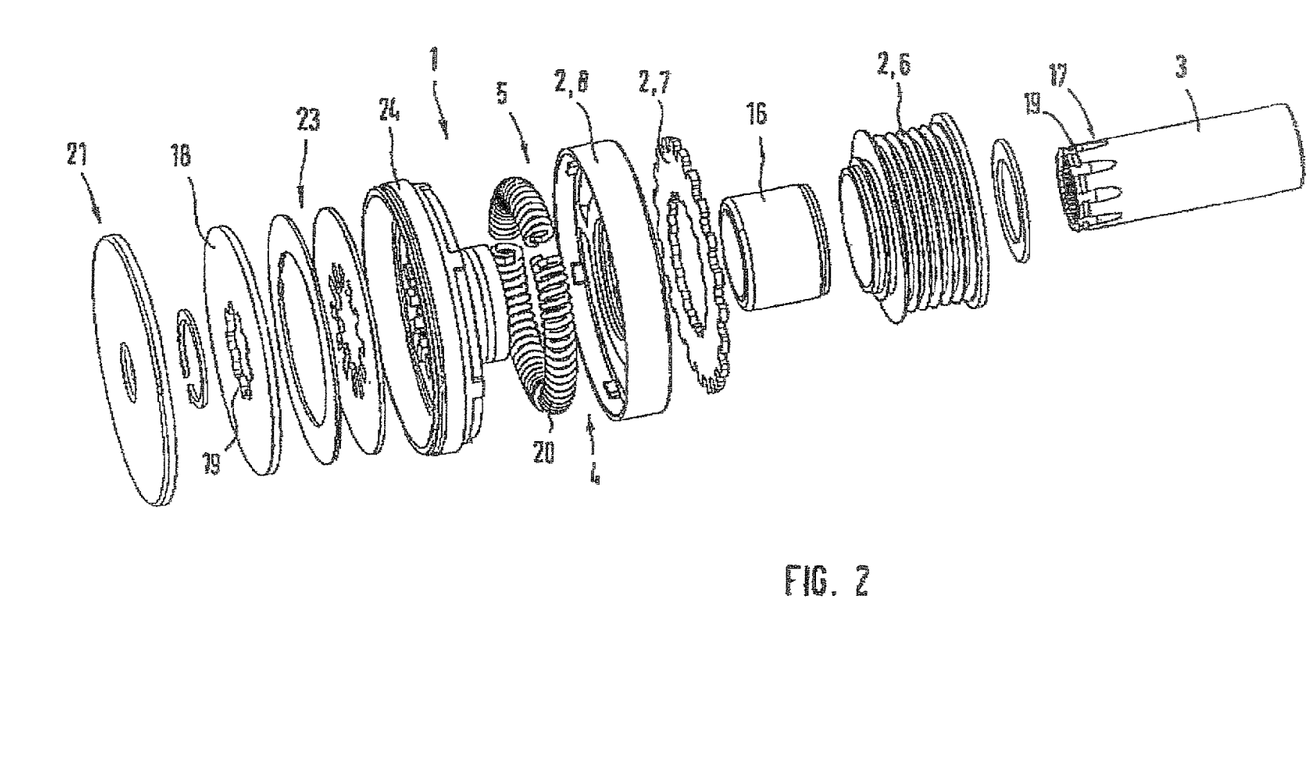
FIG. 2 shows the drive wheel in an embodiment according to the invention in an exploded illustration.

FIG. 2 shows a drive wheel 1 of an auxiliary unit belt drive of an internal combustion engine, with the individual components being illustrated in the drawn-apart state, that is to say in an exploded illustration. In this case, only the components which are of interest are denoted. The drive wheel 1, which is assigned to an auxiliary unit, for example a generator, of the auxiliary unit belt drive comprises a running casing 2 which is operatively connected to a traction mechanism (not illustrated), which running casing 2 is in turn composed of a plurality of parts 6, 7 and 8, a hub 3 which is rotationally fixedly connected to the drive axle of the auxiliary unit, and a damping device 4, which is arranged so as to act between the running casing 2 and the hub 3, for reducing rotary oscillations. The running casing 2 and specifically the running part 6 has, at its outer periphery, a contour which is matched to the traction mechanism which is used, with a V-ribbed belt being provided as a traction mechanism in the present case. The damping device 4 is formed from a serial arrangement of a spring store 5 and a slipping clutch 23. The spring store 5 has a plurality of bow springs 20 which are arranged between the running casing 2 and a driver disk 24 which is rotatably mounted on the hub 3, which bow springs 20 are guided in axially opposing semi-open annular chambers (not denoted) of the running casing 2 and of the driver disk 24, with said bow springs 20 each bearing alternately at their ends against a peripheral stop face of a driving cam of the running casing 2 and of a driving cam of the driver disk 24. The slipping clutch 23 is arranged, on the side facing axially away from the spring store 5, between the driver disk 24 and the hub 3, and has an annular-disk-shaped friction ring which is arranged between a friction face of the driver disk 24 and a driver element 18. Further details regarding this embodiment are described in DE 10 2005 059 030 A1, to which reference is hereby expressly made.

In order to obtain the largest possible restoring torque on account of the action of the bow spring or bow springs 20, it is preferably provided that the pitch circle of the bow spring (s) is selected to be as large as possible, preferably greater than the effective diameter of the running part 6.

Also of note in FIG. 2 is that the hub 3 has a cylindrical end region 17 which is provided with a tooth profile connection 19. It is hereby possible to produce a rotationally fixed connection with the driver element 18 which has a corresponding tooth profile connection 19. Material is therefore saved in the hub. In addition, more economical production is also possible (production in a continuous process).

Details regarding the design of the running casing 2 can be gathered from FIGS. 3 to 7.

The running casing 2 is composed of a total of three assembled parts, specifically of a running part 6 (belt pulley), a driver part 7 (toothed disk) and of a spring receptacle 8 (also referred to as a damper cage). The three parts are shown in an exploded view in FIG. 3.

Figure 3:
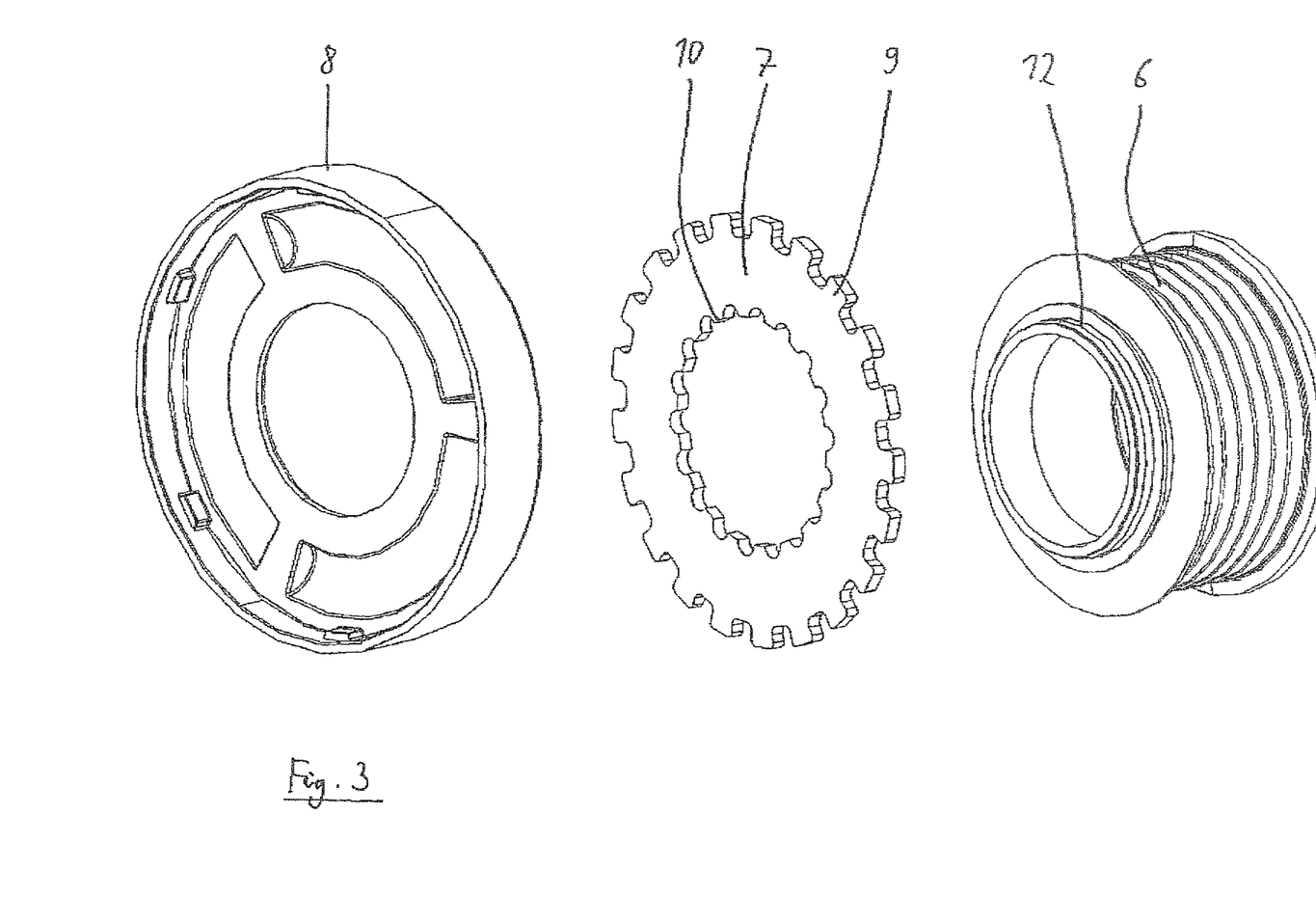
FIG. 3 shows the running casing of the drive wheel in an exploded illustration.
Figure 4:
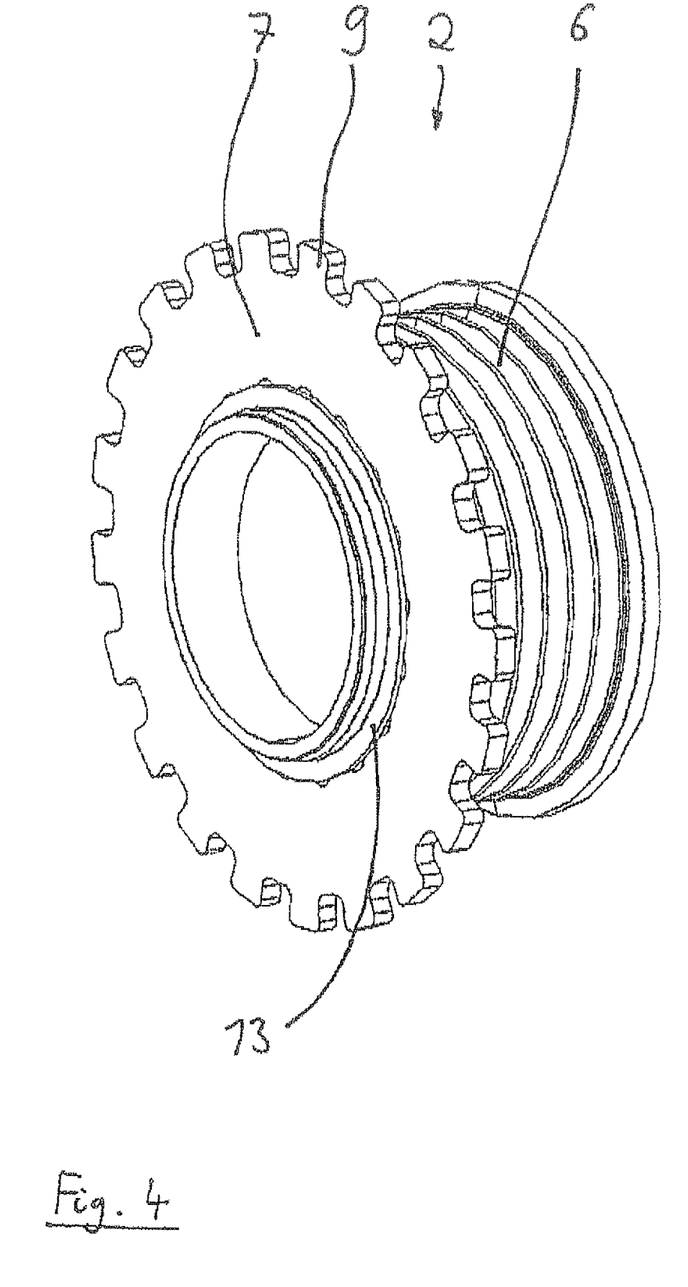
FIG. 4 shows the running part, which is connected to the driver part, of the running casing in a perspective illustration.
Figure 5:
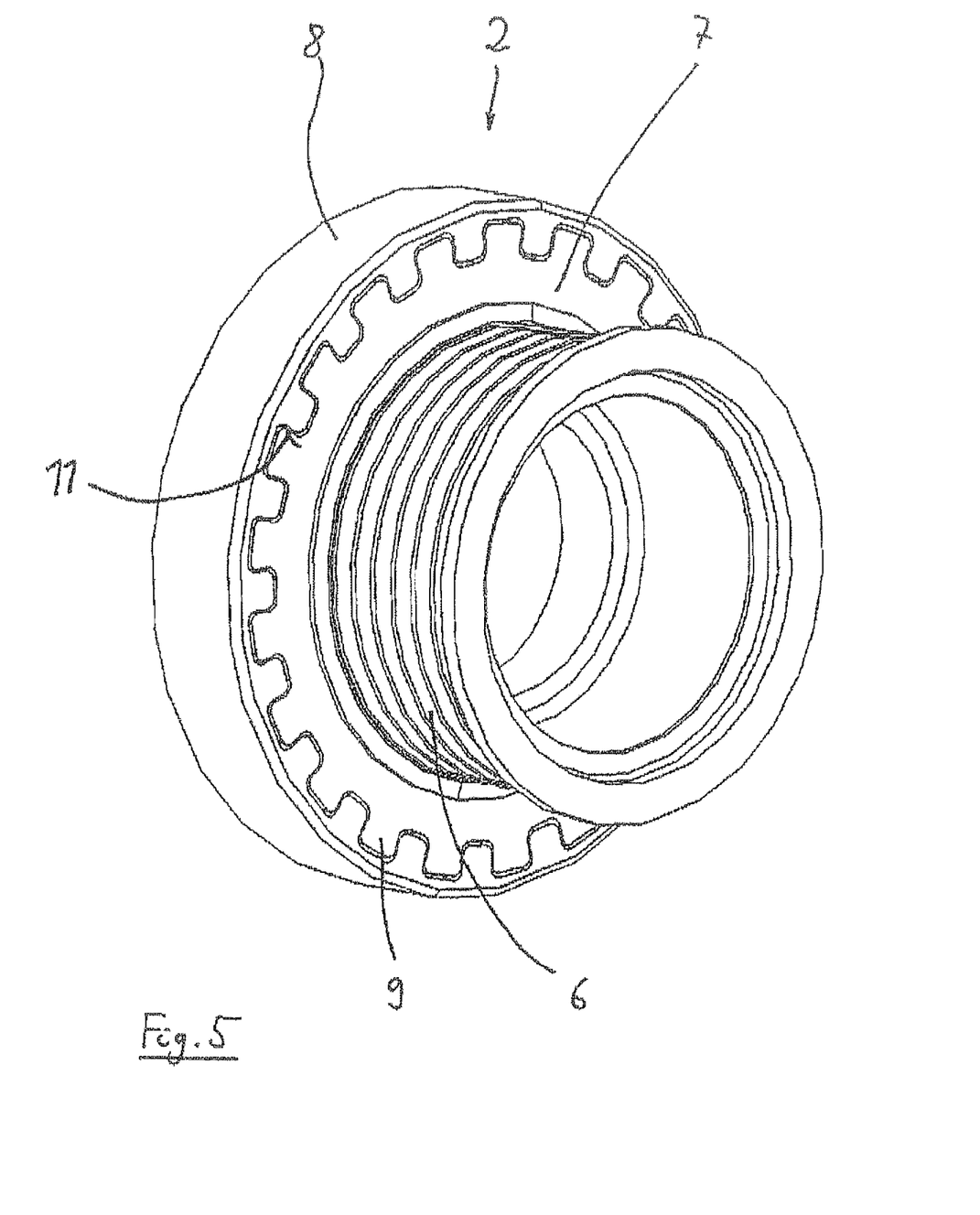
FIG. 5 shows the entire, fully-assembled running casing in a perspective view.
Figure 6:
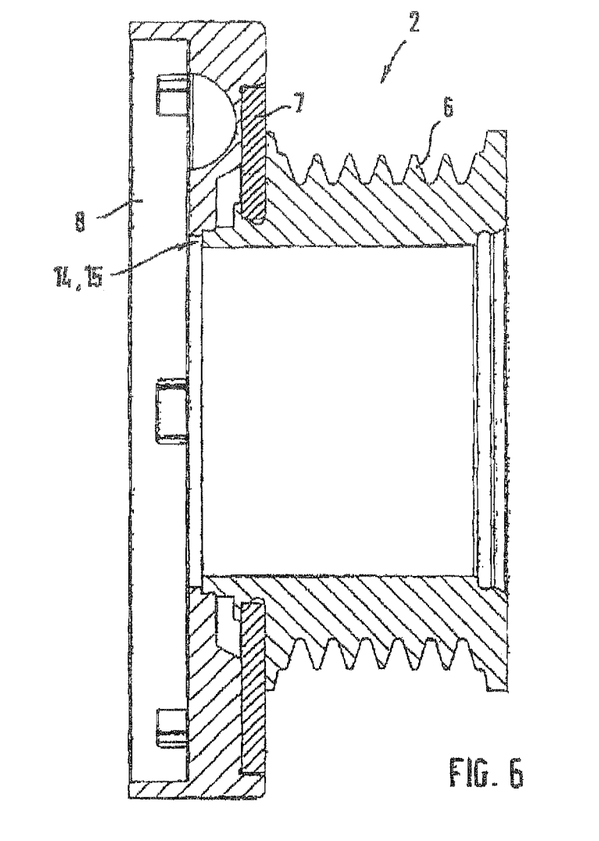
FIG. 6 shows the radial section through the running casing according to FIG. 5.
Figure 7:
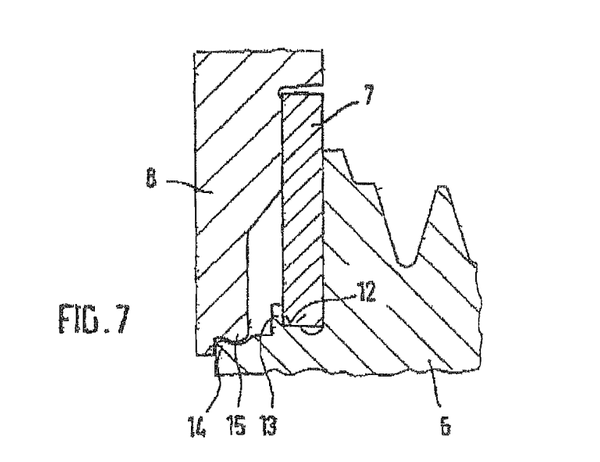
FIG. 7 is an enlarged illustration of the radial section according to FIG. 6.

The driver element 7 is an annular sheet metal disk which is punched out in the illustrated shape. The driver element 7 has a respective tooth profiling 9 and 10 both in the radially outer region and in the radially inner region.

The inner profiling 10 serves only to form radially inwardly delimited centering sections which, during the assembly of the running part 6 and driver part 7, lie on a seat section 12 of the running part 6 (see in particular FIGS. 6 and 7), and thus center the driver part 7 with respect to the running part 6.

In order that the driver disk 7 and the running part 6 are fixedly connected to one another both in the peripheral direction and also axially, an initially axially extending end region at the axial end of the running part 6 is deformed, that is to say flanged or calked, so that a deformed section 13 is formed which ensures a permanent connection of the two parts. The torque can be reliably transmitted by means of said connection.

The rotationally fixed connection between the pre-assembled unit composed of the running part 6 and the driver part 7 and the spring receptacle 8 is produced by means of the profiling 9 arranged on the outer periphery of the driver part 7. For this purpose, the spring receptacle 8 has correspondingly profiled recesses 11 into which the profiling 9 engages. This can be seen most clearly in FIG. 5.

During the assembly of the unit 6, 7 with the spring receptacle 8, the profiling 9 is inserted with fitting accuracy into the recesses 11 and the parts 6, 7 and 8 are then pushed axially towards one another. As can be seen most clearly in FIG. 7, an outwardly directed radial projection 14 is situated on the running part 6 in the axial end region of the latter; the spring receptacle 8 correspondingly has an inwardly-directed radial projection 15. Here, the radial projection 14 has a greater outer diameter than the radial projection 15. The two projections therefore together form a form-fitting connection in the manner of a clip connection.

The bearing 16 which mounts the running casing 2 relative to the hub 3 is embodied in the exemplary embodiment as a double-row needle bearing which is provided with a frictional (sealing ring) and/or with a non frictional seal (gap seal). Also possible is the alternative use of a plain bearing.

In the prior art—as shown in FIG. 1—a cover 22 is usually provided in the left-hand end-side region of the drive wheel 1. In order to promote the dissipation of (friction) heat in a simple manner, a cover is advantageously not provided in the embodiment according to the present invention. There is a less hindered heat flow from the heat source (bearing arrangement in the center of the drive wheel) to the end-side region.

LIST OF REFERENCE SYMBOLS

1 Drive wheel
2 Running casing

3 Hub
4 Damping device
5 Spring store
6 Running part
7 Driver part
8 Spring receptacle
9 Profiling (tooth profile)
10 Profiling (tooth profile)
11 Recess
12 Seat section
13 Deformed section
14, 15 Form-fitting connection
14 Radial projection
15 Radial projection
16 Bearing
17 Cylindrical end region
18 Driver element
19 Spline connection/tooth profile connection
20 Spring element
21 End-side region
22 Cover
23 Slipping clutch
24 Driver disk

The invention claimed is:

1. A drive wheel of an auxiliary unit belt drive of an internal combustion engine, comprising:
 a running casing, which is operatively connectable to a traction mechanism;
 a hub, which is rotationally fixedly connectable to a drive axle of an auxiliary unit; and
 a damping device, which is arranged so as to act between the running casing and the hub, for reducing rotary oscillations, having a spring store which is arranged so as to act between the running casing and the hub,
 wherein the running casing is composed of a running part, a driver part and a spring receptacle, with the running part being rotationally, fixedly and permanently connected directly to the driver part,
 wherein the running part is an annular section which has an outer periphery with a plurality of grooves and a contour that is matched to the traction mechanism,
 wherein the driver part is a flat ring which has a radially outwardly extending profiling at an outer periphery of a radially outer end region,
 wherein the spring receptacle has at least one continuously extending, uninterrupted recess with radial projections therein that interacts with and corresponds to a shape of the radially outwardly extending profiling of the driver part, and
 wherein the radially outward extending profiling of the driver part engages directly into the recess of the spring receptacle, connecting the driver part radially to the spring receptacle in a form-locking manner such that the driver part is housed entirely within the spring receptacle.

2. The drive wheel according to claim 1, wherein the driver part has a radially inward extending profiling at an inner periphery of a radially inner end region, and the radially inward extending profiling is a toothed profiling which has at least one undercut in a peripheral direction.

3. The drive wheel of claim 1, wherein the radially outward extending profiling of the driver part is a toothed profile.

4. The drive wheel of claim 1, wherein the driver part is directly fixed to the running part by means of a deformed section of the running part.

5. The drive wheel of claim 4, wherein the driver part is centered relative to the running part by means of the deformed section of the running part.

6. The drive wheel of claim 4, wherein the deformed section is a calked or flanged portion.

7. The drive wheel of claim 1, wherein the radially outward extending profiling is radial projections which interacts with the radial projections on the spring receptacle.

8. The drive wheel of claim 7, wherein the radial projections on the spring receptacle point radially inward.

9. The drive wheel of claim 7, wherein the radial projections on the running part and the radial projections on the spring receptacle are formed so as to be rounded as viewed in a radial section.

10. The drive wheel of claim 1, wherein the driver part is composed of a planar metal sheet.

11. The drive wheel of claim 1, wherein the driver part is produced by means of a punching process.

12. The drive wheel of claim 1, wherein a bearing is arranged between the running casing and the hub.

13. The drive wheel of claim 12, wherein the hearing is a rolling bearing.

14. The drive wheel of claim 12, wherein the bearing has a seal.

15. The drive wheel of claim 1, wherein the hub has a cylindrical end region which is rotationally fixedly connected to a drive element.

16. The drive wheel of claim 15, wherein the rotationally fixed connection between the hub and the drive element is a spline connection or tooth profile connection.

17. The drive wheel of claim 1, wherein an effective diameter of a spring element of the spring store is formed to be greater than an outer diameter of the running part.

18. The drive wheel of claim 17, wherein the spring element is a bow spring.

19. The drive wheel of claim 1, wherein an end-side region of the drive wheel is free from a cover.

20. The drive wheel of claim 1, wherein the damping device comprises a serial arrangement of the spring store and a slipping clutch, with the spring store being arranged so as to act between the running casing and a driver disk which is rotatably mounted on the hub, and the slipping clutch being arranged so as to act between the driver disk and the hub.

* * * * *